Feb. 20, 1968   F. G. BUSS   3,370,286
APPARATUS FOR MONITORING THE FEEDING
OF TAPELIKE RECORD CARRIERS
Filed March 22, 1965

INVENTOR
FOCKE GERD BUSS
BY Toulmin & Toulmin
ATTORNEYS

United States Patent Office 3,370,286
Patented Feb. 20, 1968

3,370,286
APPARATUS FOR MONITORING THE FEEDING
OF TAPELIKE RECORD CARRIERS
Focke Gerd Buss, Giesselhorst, Germany, assignor to
Olympia Werke A.G., Wilhelmshaven, Germany
Filed Mar. 22, 1965, Ser. No. 441,803
Claims priority, application Germany, May 12, 1964,
O 10,135
5 Claims. (Cl. 340—259)

ABSTRACT OF THE DISCLOSURE

Apparatus for monitoring the movement of a record carrier in which a first impulse is developed by the feed mechanism for the carrier while a second impulse is developed in accordance with the movement of the carrier, which second impulse normally occurs before the first impulse from the feed mechanism is terminated, together with a signalling device which is energized if the impulses do not coincide.

The invention relates to an apparatus for monitoring the feeding of tapelike record carriers.

The object of the present invention, therefore, is the provision of an improved supervision or monitoring device for record tapes, including a control circuit of a special type, which avoids the disadvantages of the prior art above referred to.

The object of the present invention, which permits supervision or monitoring of the feed of record carrying tapes is realized by providing a device which is equally suitable for tapes traveling at different speeds in continuous motion as well as for tapes actuated by the start-stop method.

The invention is characterized by the use of a first bistable switching member, namely, a "flip-flop," or vibrator controlling the feed of the tape. The first input of the flip-flop is connected to an impulse generator controlled by the tape feeding mechanism, while the second input is connected to a tape sensing mechanism, the outlet of the flip-flop being connected to an AND circuit connected to an error signaling or an error correcting means.

This new system provides a digital feed control by which accurate supervision or monitoring of different tape speeds can be maintained. The controlling impulses are produced by the driving means and also by the tape itself through the sensing mechanism. Irregularities caused by poor frictional contact between the tape and a mechanical impulse generator, such as are encountered in the known devices, are completely avoided by the present invention.

The impulse generator always produces one impulse per record mark. Between the output of the impulse generator and the first flip-flop, and evaluator for the leading edge of each impulse is interposed.

Parallel to the evaluator for the leading edge, there is also an evaluator for the trailing edge of the impulse connected to the second input of the AND circuit, the latter being connected between the output of the first flip-flop and the error signaling or evaluating device.

In the present invention the first flip-flop is actuated by the leading edge of an impulse from the generator in such a manner that the first input of the serially connected AND circuit will be opened. If the tape is being transported correctly, the sensing station will give an impulse which will return the flip-flop to its former setting. If, in consequence of an irregularity in the feed of the tape, this last impulse does not occur, then the trailing edge of the impulse from the generator will open the second input of the AND circuit whereby the latter is rendered conductive for transmitting an error signal and/or evaluator through the second flip-flop.

In the present invention three time points must be distinguished between. The first point is determined by the leading edge of the impulse from the generator. The second point is determined by the trailing edge of the same impulse, while the third point lies between the first and second points and is determined by an impulse from the tape-sensing station whose sensing mechanism can operate with a magnetic feeler or with a photocell, depending on the kind of record that is carried by the tape.

Whenever the impulse from the sensing station does not fall between the two first mentioned points, an irregularity in the movement of the tape is indicated by the signalling or evaluating device which is energized by an impulse passing through the AND circuit.

The interval between the first two points can be regulated by adjustment of the impulse generator. In this manner the apparatus can be adjusted to different tape speeds.

The invention permits movement of the tape to be controlled at a single point or mark on the record, so that it can be used either with a continuously moving tape or with a start-stop movement.

The connection to the impulse generator can be by any suitable means, depending on the mechanism by which the tape is driven.

The present invention will be more fully understood by reference to the following description taken in connection with the accompanying drawings, in which.

Figure 1:
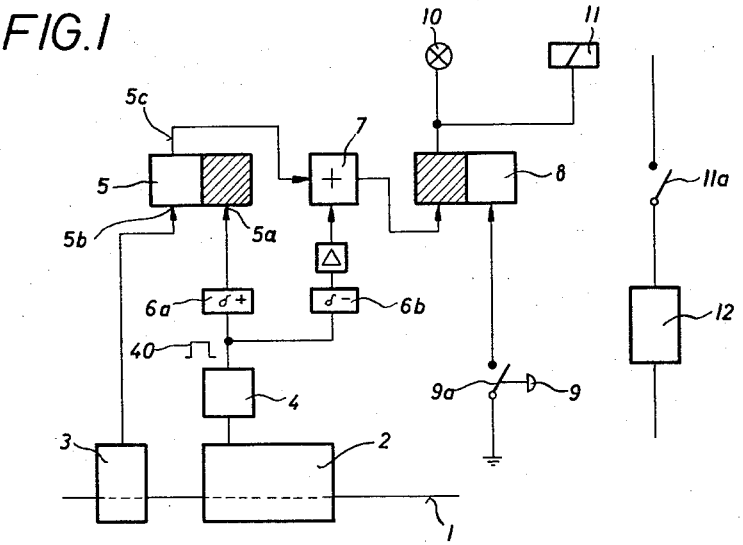
FIGURE 1 is a schematic representation of the electric circuit of this invention.

FIGURE 1 shows schematically a tapelike record carrier 1, a tape feeder 2 and a sensing station 3. The tape feeder 2 can have any suitable means to move the tapelike record carrier 1 either continuously or by the start-stop method.

The specific sensing means used in the sensing station 3 also depends on the kind of tape 1 that is used. If the tape carries a magnetic record, then a magnetic sensing device should be used, but with a perforated tape a photocell is preferable. This station senses the tape movement at a time between the leading and trailing edges of the impulse from generator 4.

The tape feeding mechanism has operatively connected to it an impulse generator 4 which is adapted to produce one impulse 40 per gradation on the record. By a gradation is meant the interval between successive marks on the tape. This generator is actuated by the tape drive.

The impulse generator 4 produces at its output an impulse 40 with a pronounced leading edge and a pronounced trailing edge.

The impulse generator has evaluators 6a and 6b connected to it. The evaluator 6a responds to the leading edge of an impulse 40, whereas the evaluator 6b responds to the trailing edge of the impulse.

The evaluator 6a is connected to the first inlet of the flip-flop 5 whose second inlet 5b has the sensing station 3 connected to it.

The outlet 5c of the first flip-flop 5 is connected to an inlet of the AND circuit 7, the second inlet of which is connected to the evaluator 6b of the trailing edge of the impulse 40.

The AND circuit 7 has its outlet connected to the first inlet of a second flip-flop 8, the second inlet of which is connected to a switch 9a operated by a key 9 by means of which the flip-flop can be returned to its original setting after an error has been signaled.

The outlet of the second flip-flop 8 is connected to a signal lamp 10 which always lights up when there is an error in the movement of the tape.

In parallelism with the lamp 10 is a relay 11 connected by a contact 11a with an error evaluator 12.

Figure 2:
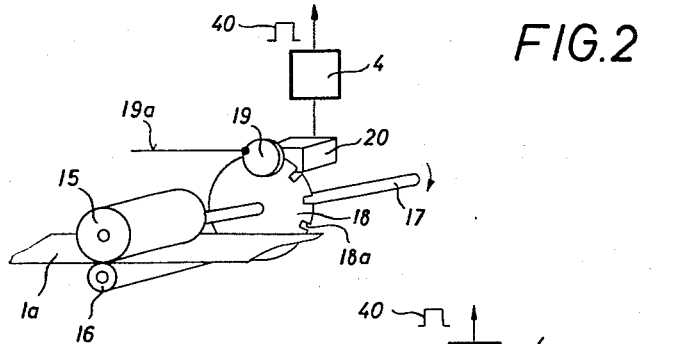
FIGURE 2 is a perspective view of a detail thereof with a continuous drive for the tape.

FIGURE 2 shows in fragmentary perspective the tape feeder 2 for a continuously moving tape. The tape 1a is moved continuously by a driving roller 15 in combination with a pressure roller 16. The driving roller 15 is rotated by a shaft 17 carrying a slotted disc 18 with peripheral radial slots 18a which are coordinated with the gradations of the tape.

The slotted disk 18 is positioned in a known manner between a lamp 19 and a photocell 20, the lamp being connected to an electric conductor 19a.

By rotation of the shaft 17 and the slotted disk 18, impulses are delivered by the lamp 19 to the photocell 20 for controlling the impulse generator 4, from the outlet of which impulses 40 will be delivered to the evaluators 6a and 6b for the purposes stated.

Figure 3:
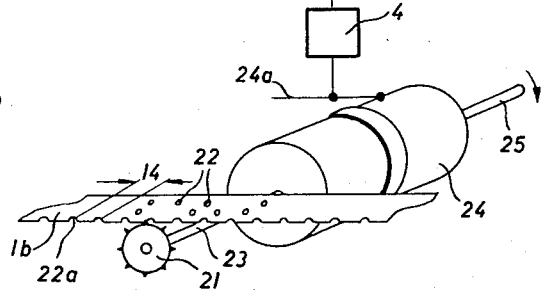
FIGURE 3 is a perspective view of a detail of a modification with a start-stop drive for the tape.

If the invention is to be used for the supervision of perforated tape-like record carriers operated by the start-stop method, then the tape feeder can be constructed as shown in FIGURE 3. The perforated tape 1b has signaling perforations 22 and also transport holes 22a. A sprocket wheel 21 engages these holes in a known manner and is carried by a shaft 23 driven by a shaft 25 through a single revolution coupling 24 in a known manner. Periodic disengagement of the single revolution coupling is effected by an electric conductor 24a.

In the examples hown in FIGURE 3 the impulse generator 4 is excited by the impulses which are delivered by the conductor 24a thereby controlling the generator in synchronism with the tape drive.

In FIGURE 3 one gradation, namely, the space between successive perforations, is indicated at 14.

The impulse generator 4 can be equipped with any suitable means for regulating the length of one impulse 40. By adjusting the length of the impulse, the apparatus can be used with tapes moved at different speeds.

If the impulse generator 4 of FIGURE 2 or FIGURE 3 is put into action, the first flip-flop 5 is actuated by the leading edge of the impulse 40 acting through the evaluator 6a. The flip-flop then moves into its second stable setting whereby the first inlet of the AND circuit is opened.

In the absence of any disturbance the tape moves forward so that a hole or a gradation can be sensed on the tape. The impulse produced thereby is sensed by station 3 and restores the first flip-flop to its former setting so that thence the first inlet and the AND circuit will be at rest.

The trailing edge of impulse 40 acts through the evaluator 6b upon the second inlet of the AND circuit 7. If the tape movement is disturbed there will be no impulse produced by the sensing station 3 so that the first flip-flop will not be returned to its original setting. Both inlets of the AND circuit 7 will then be energized and will be rendered conductive so as to energize the second flip-flop 8 which will, for example, light a lamp or actuate a relay. The relay 11 actuates a contact 11a which can be connected to an error evaluator 12.

The second flip-flop 8 can be restored to its original setting by a key 9 connected to a switch 9a.

It will be understood that this invention is susceptible to modification in order to adapt it to different usages and conditions and accordingly, it is desired to comprehend such modifications within this invention as may fall within the scope of the appended claims.

What is claimed is:

1. In combination; a record carrying tape and drive means for driving the tape, and means for monitoring the movement of the tape by the drive means comprising an impulse generator operated by said drive means and operable for developing a first signal in the form of an impulse having a leading edge and a trailing edge for a predetermined feed length of the tape, sensing means sensing the movement of the tape and operable to develop a second signal in response to tape movement and which occurs in the interval between said leading and trailing edges of said impulse when the tape is in synchronism with the drive means, a first flip flop circuit having a first input connected to said impulse generator to receive an actuating impulse from said leading edge of said impulse and having a second input connected to said sensing means to receive the said second signal therefrom and also having an output which is energized only when said first input is the last actuated one of the two inputs to the respective flip flop circuit, an AND circuit having a first input connected to the output of said first flip flop circuit and a second input connected to said impulse generator to receive an actuating impulse from said trailing edge of said impulse and also having an output which is energized only when both inputs of the AND circuit are energized, a second flip flop circuit having a first input connected to the output of said AND circuit and also having a second input and having an output which is energized only when said first input of the respective flip flop circuit is the last actuated one of the two inputs thereof, and a signalling circuit connected to the output of said second flip flop circuit whereby said signalling circuit will be energized only when the first input of said first flip flop circuit and the second input of said AND circuit have been actuated and the second input of said first flip flop circuit has not been actuated.

2. The combination according to claim 1 in which a selectively operable resetting switch for the signalling circuit is connected to the said second input of said second flip flop circuit.

3. The combination according to claim 2 in which error evaluating means is included in said signalling circuit.

4. The combination according to claim 3 which includes an evaluator connected between said impulse generator and the first input of said first flip flop circuit and the second input of said AND circuit and each evaluator being responsive to a respective one only of the said leading and trailing edges of an impulse from said generator for supplying an actuating impulse to the pertaining input.

5. In combination; a record carrying tape and drive means for driving the tape, and means for supervising or monitoring the movement of the tape comprising an impulse generator operated by said drive means to develop a first signal impulse for a predetermined feed length of the tape, said first impulse having a leading edge and a trailing edge, means for sensing the movement of the tape and operable for developing a second signal impulse in response to tape movement and which second impulse will occur normally chronologically within the interval between the leading and trailing edges of said first impulse, a signalling circuit, a bistable control element for said signalling circuit having a first condition wherein energy is not supplied to said signalling circuit and a second condition wherein energy is supplied to said signalling circuit, said supply means normally being in its said first condition, first means operated by the leading edge of said first impulse for preparing said bistable control element for changing to its said second condition, second means operated by the trailing edge of said first impulse operable for completing the change of said bistable control element to its said second condition if said first means is effective, and third means operated by said second impulse for making said first means ineffective whereby said bistable control element is changed to its second condition so as to energize said signalling circuit only when said second impulse does not occur in the interval between the leading and trailing edges of said first impulse, and means for returning said bistable control element to its said first condition after change thereof to its said second condition.

References Cited

UNITED STATES PATENTS

| | | | |
|---|---|---|---|
| 2,963,293 | 12/1960 | Klein | 340—259 |
| 2,994,783 | 8/1961 | Loosche. | |
| 2,996,630 | 8/1961 | Bensema et al. | |
| 3,146,432 | 8/1964 | Johnson | 340—259 X |

JOHN W. CALDWELL, *Primary Examiner.*

NEIL C. READ, *Examiner.*

D. L. TRAFTON, *Assistant Examiner.*